United States Patent [19]
Huang et al.

[11] Patent Number: 5,457,289
[45] Date of Patent: Oct. 10, 1995

[54] FRONTALLY SHIELDED CAPACITIVE TOUCH SENSOR SYSTEM

[75] Inventors: Hung-Chih Huang, Lowell; Robert A. Stein, Boxford, both of Mass.

[73] Assignee: Microtouch Systems, Inc., Methuen, Mass.

[21] Appl. No.: 213,684

[22] Filed: Mar. 16, 1994

[51] Int. Cl.[6] .............................. G08C 21/00; G09G 3/02
[52] U.S. Cl. .............................. 178/20; 345/173; 345/174
[58] Field of Search .................................. 178/18, 19, 20; 345/173, 174

[56] References Cited

U.S. PATENT DOCUMENTS 4,831,566  5/1989  Matthews et al. .................. 178/20 X
5,381,160  1/1995  Landmeier .............................. 345/174

Primary Examiner—Stephen Chin
Assistant Examiner—Paul Loomis
Attorney, Agent, or Firm—Iandiorio & Teska

[57] ABSTRACT

A frontally shielded capacitive touch sensor system includes a capacitive touch sensor having a touch sensitive surface; a front shield mounted in front of the touch sensor and extending peripherally about the surface surrounding an exposed accessible area of the touch sensitive surface; a device for providing a first voltage on the touch sensor and detecting a change in capacitance representative of a touch to the touch sensor and for providing a second voltage on the front shield for controlling the capacitance between the touch sensor and the front shield and shielding the system from stray capacitance occurring at the front shield.

10 Claims, 4 Drawing Sheets

FRONTALLY SHIELDED CAPACITIVE TOUCH SENSOR SYSTEM

FIELD OF INVENTION

This invention relates to a frontally shielded capacitive touch sensor system, and more particularly to such a system in which a front shield is driven to control the capacitance between it and the touch sensitive surface to release or eliminate stray capacitance effects.

BACKGROUND OF INVENTION

In present capacitive touch sensors the position of the touch by a finger or stylus is determined as a function of the current flow at the capacitive contact point. See for example U.S. Pat. Nos. 4,071,691, 4,129,747, 4,198,539, 4,293,734, 4,302,011, 4,371,746, 4,430,917. However, stray capacitance, as for example the capacitance introduced by the placement of the user's free hand on or near the sensor or its periphery, such as on the bezel, causes the system to determine the touch points as the average position between the two locations, as a function, for example, of the relative current flows. In one attempt to overcome this problem the stray capacitance is sensed periodically and provided to the detection circuit which can then compensate for it. However, this solution is not satisfactory. For while the stray capacitance of the free hand of the user, left in place on the bezel, can be compensated for in this way, that stray capacitance is not predictable at the critical moment. That is, when the user touches the sensor with a finger of the other hand the stray capacitance introduced by the free hand readjusts in the manner of a bridge circuit so the real value of the stray capacitance changes. Further, the sensed level of stray capacitance constitutes a bias which subtracts from the overall dynamic range of the system. Other attempts to address the stray capacitance problem have used sophisticated signal processing and software techniques, but these approaches are complicated and compensate for the problem rather than seek to eliminate it at its source.

SUMMARY OF INVENTION

It is therefore an object of this invention to provide a frontally shielded capacitive touch sensor system which is simple, effective, and seeks to eliminate rather than compensate for stray capacitive problems.

It is a further object of this invention to provide a frontally shielded capacitive touch sensor system having greater accuracy.

It is a further object of this invention to provide a frontally shielded capacitive touch sensor system which virtually eliminates the effects of stray capacitance.

It is a further object of this invention to provide a frontally shielded capacitive touch sensor system which is capable of compensating for capacitive leakage losses to the ambient environment.

It is a further object of this invention to provide a frontally shielded capacitive touch sensor system which increases the dynamic range of the system.

The invention results from the realization that a touch sensor system can be made truly insensitive to stray capacitance by providing a front peripheral shield about a touch surface to shield the surface from stray capacitance, and that the shield may be made to shield the system from stray capacitance occurring at the shield, and from leakage to the ambient environment by controlling the voltage on the shield from as low as ground voltage, to voltages that are less than, equal to or greater than the voltage on the touch sensor.

This invention features a frontally shielded capacitive touch sensor system including a capacitive touch sensor having a touch sensitive surface. A front shield is mounted in front of the touch sensor and extends peripherally about the surface surrounding an exposed accessible area of the touch sensitive surface. There are means for providing a first voltage on the touch sensor and detecting a change in capacitance representative of a touch to the touch sensor, and for providing a second voltage on the front shield for controlling the capacitance between the touch sensor and the front shield and thereby shielding the system from stray capacitance occurring at the front shield.

In a preferred embodiment the second voltage may be substantially equal to the first voltage and substantially eliminate the capacitance between the front shield and the surface as well as the stray capacitance occurring at the front shield. The second voltage may be greater than the first voltage and may substantially eliminate the capacitance between the first shield and the surface, the stray capacitance occurring at the front shield, and may substantially compensate for stray capacitance between the exposed accessible area and the ambient atmosphere. The second voltage may be less than the first voltage and may be ground voltage. The means for providing a first voltage may include a voltage distribution network disposed about the periphery of the touch sensitive surface and the front shield may cover that distribution network. The front shield may include a front conductive layer and a rear non-conductive layer for interfacing with the touch surface and providing the proper capacitive coupling between the front conductive layer and the touch surface. The means for providing the first and second voltages may include conductor means for interconnection with the touch sensor. The conductor means may be integral with the front shield and may include a plurality of terminals for engaging sensor contacts on the touch sensor.

DISCLOSURE OF PREFERRED EMBODIMENT

Other objects, features and advantages will occur to those skilled in the art from the following description of a preferred embodiment and the accompanying drawings, in which.

Figure 1:
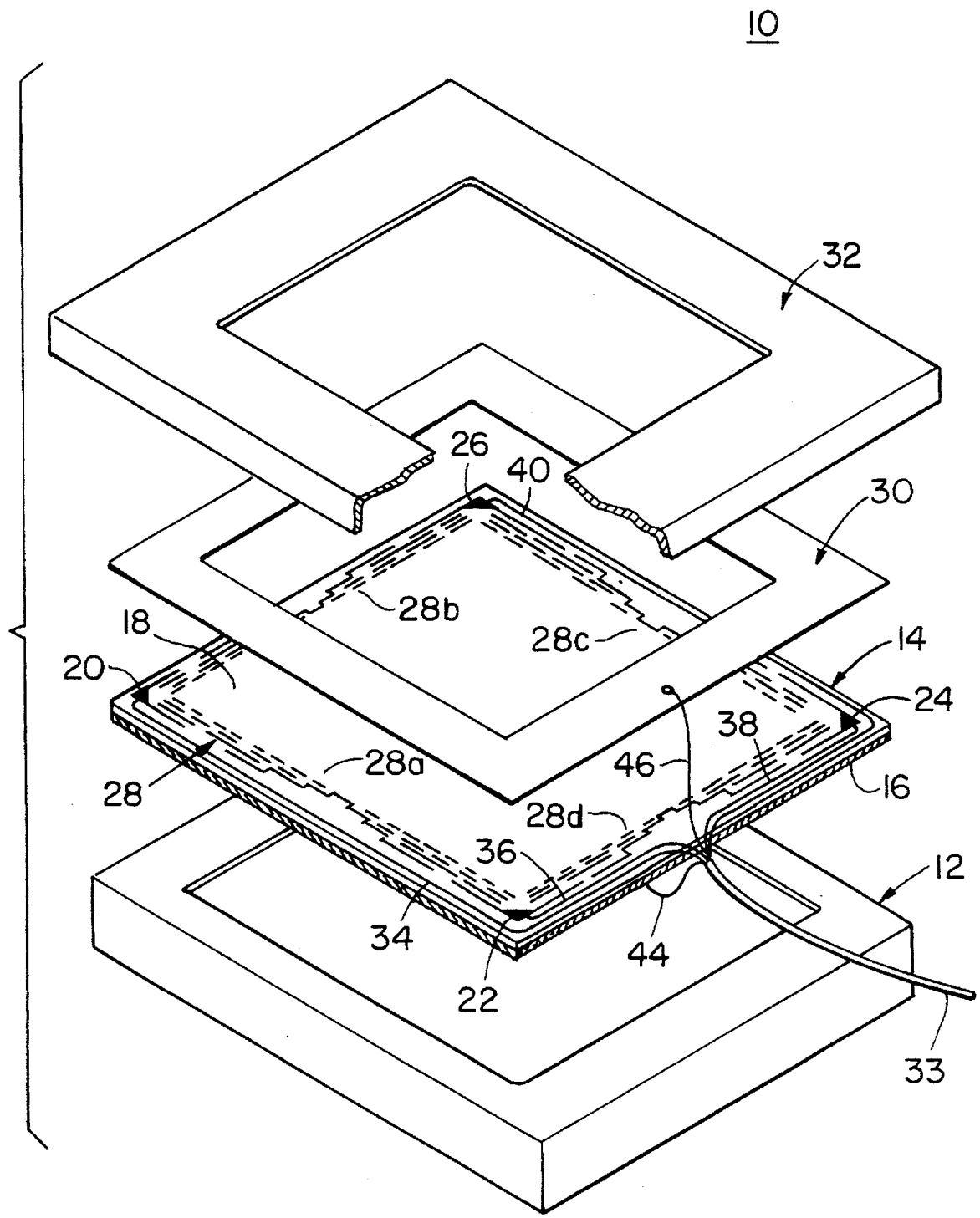
FIG. 1 is an exploded isometric view of a touch sensor system using the front shield according to this invention.

This invention may be accomplished with a frontally shielded capacitive touch sensor system which includes a capacitive touch sensor having a touch sensitive surface such as that disclosed in U.S. Pat. Nos. 4,071,691, 4,129, 747, 4,198,539, 4,293,734, 4,302,011, 4,371,746, 4,430,917, and as is well known in the prior art. These systems have some means for providing a voltage on the touch sensor for detecting any change in the current flow representative of a touch on the touch sensor. Typically the touch sensitive surface is on a transparent plate such as glass which covers a display such as a CRT or LCD display. At the four corners of the surface are driver contacts, each of which is driven by a voltage that is distributed by a linearization network that extends peripherally along the four edges of the surface. A touch on this surface affects the capacitive coupling which changes the capacitance. The position is then detected as a function of the difference in current flows provided by the four corner contacts, also as well known and explained in the above-cited patents, incorporated herein by reference. A back shield is often used as suggested by the aforementioned patents to accommodate for stray signals and capacitances introduced from the display portion of the system.

In accordance with this invention, a front shield is provided which extends peripherally about the touch sensor surface surrounding an exposed accessible area of the touch sensitive surface which is where the touch activity is to take place. The second voltage controls the capacitance between the sensor and the front shield, thereby shielding the system from stray capacitance occurring at the front shield. For example, the front shield may be kept at the same voltage as the touch surface and any stray capacitance, occurring, for example, because a user places a free hand on the edge of the screen or on the bezel surrounding it is ignored by the system since there is no capacitive coupling between the shield and the touch surface. If the voltage on the front shield is less than that on the touch surface, the effects are somewhat lessened but are still present and effective. With the voltage on the front shield substantially equal to the voltage on the touch surface, there is no capacitive bias which in prior art devices subtracts from the dynamic range of operation of the system. Thus this invention enables the full dynamic range capability to be utilized to detect a touch signal. In fact, even when the front shield is maintained at ground relative to the voltage on the touch surface, suppression of stray capacitance and signals is effected. However, at that point the large capacitance introduced by the difference in voltage between ground and the voltage on the touch surface introduces a substantial fixed capacitance which subtracts from the overall dynamic range of the system. If the voltage on the front shield is increased above the voltage on the touch surface, then even the exposed accessible area within the periphery of the front shield is shielded. That is, the exposed surface normally leaks some current off into the ambient ground. The increased voltage on the front shield above that on the touch surface provides a slightly positive capacity which compensates for this small loss. The front shield may be made wide enough to cover the linearization network along the edges of the touch surface, but this is not a necessary limitation of the invention.

There is shown in FIG. 1 a frontally shielded capacitive touch system 10 according to this invention which includes a conventional display 12 such as an LCD or CRT, and a touch screen 14 which may include on its rear side a back shield 16.

Figure 2:
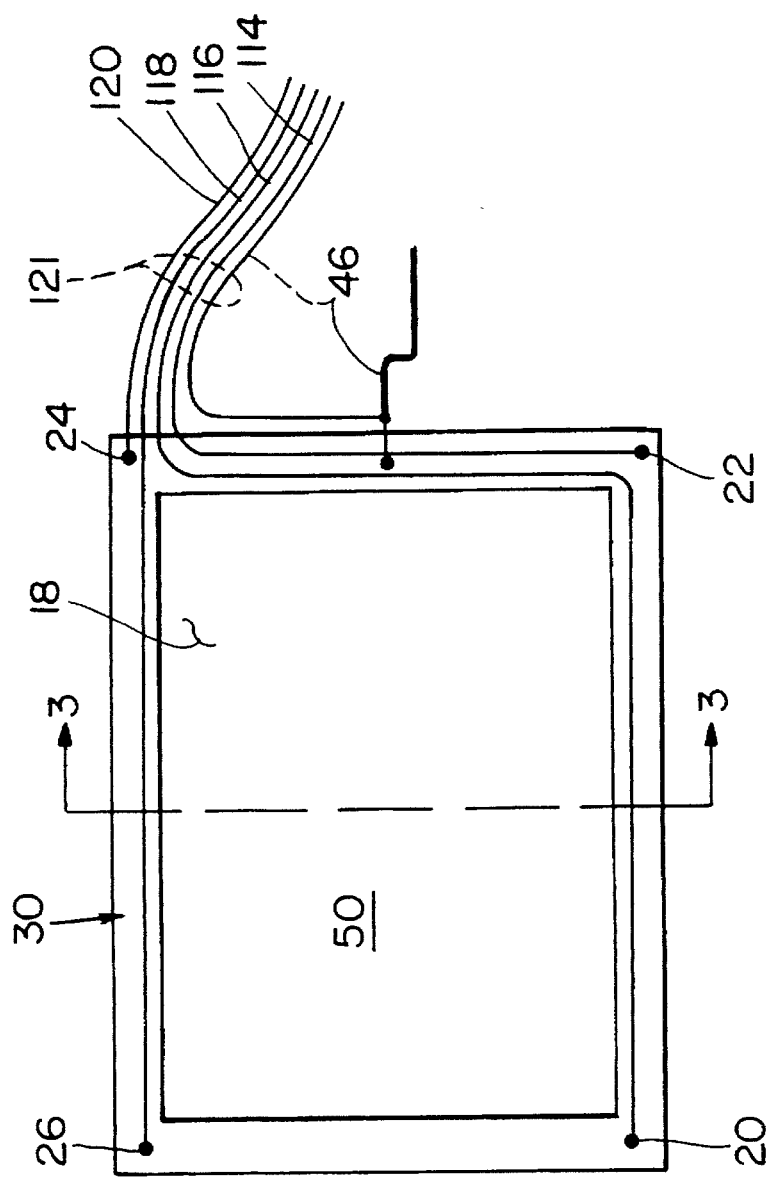
FIG. 2 is a front plan view of the front shield of FIG. 1.
Figure 3:
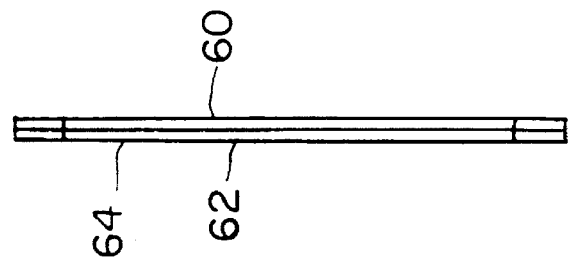
FIG. 3 is a diagrammatic sectional view taken along line 3—3 of FIG. 2.

On the surface 18 of touch sensor 14 are four corner contacts 20, 22, 24 and 26 through which is driven the linearization network 28 disposed about the four edges 28a, 28b, 28c and 28d of touch surface 18. Front shield 30 covers touch surface 18 in the peripheral area typically covering linearization network 28 and a bezel or other finish fascia 32 completes the assembly. Cable 33 includes the four wires 34, 36, 38 and 40 to drive four corners 20, 22, 24 and 26, respectively, as well as the wire 44 that drives back shield 16 and wire 46 that drives front shield 30. The peripheral extent of front shield 30 surrounds the exposed touch-accessible area 50, FIG. 2, of touch surface 18. Front shield 30 includes a conductive layer 60, FIG. 3, backed by a non-conductive layer 62 so that the conductive layer 60 is insulated from touch surface 18 and can provide the proper capacitance. An adhesive backing 64 is provided on nonconductive layer 62 for securing front shield 30 to touch surface 18.

Figure 4:
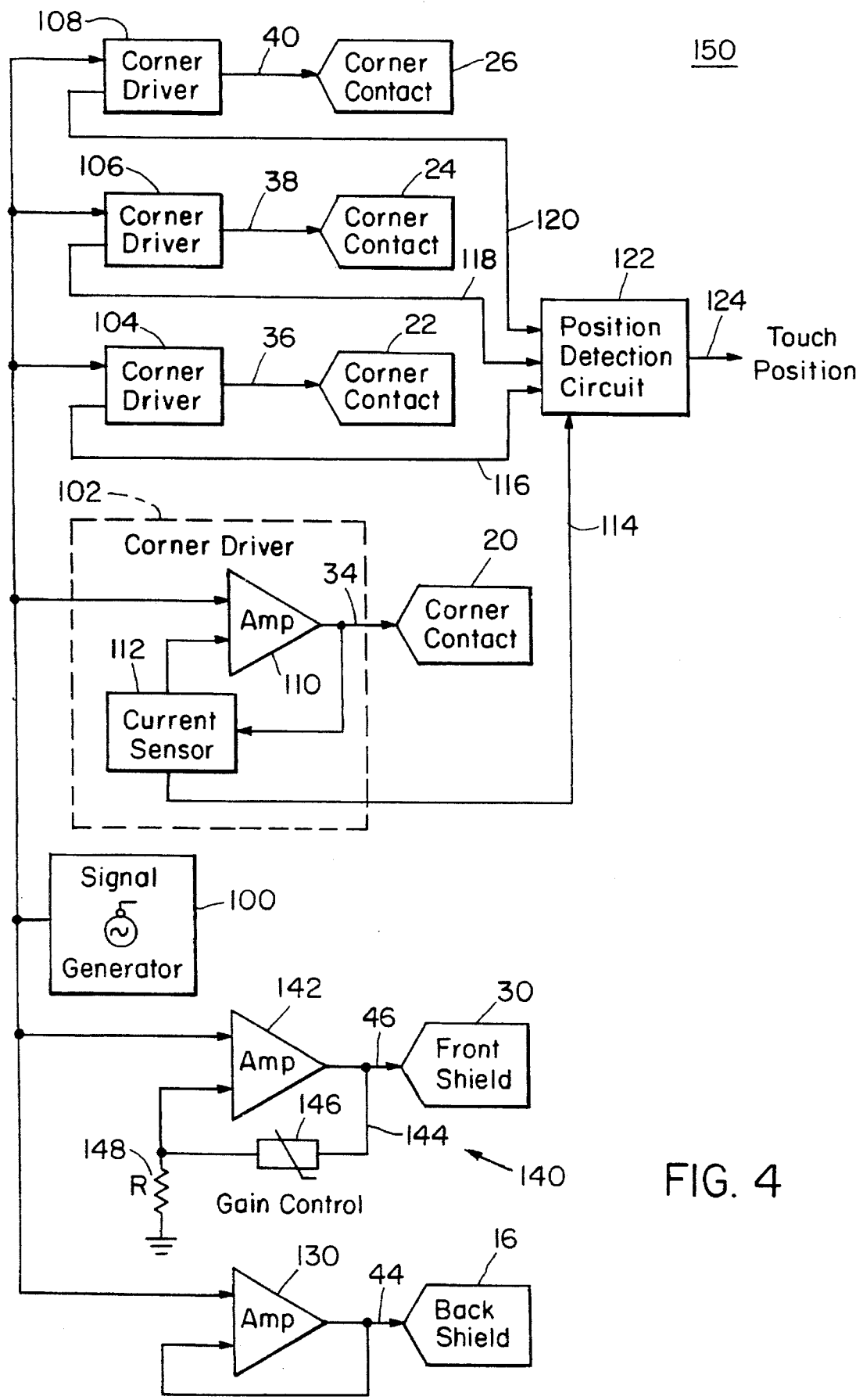
FIG. 4 is a schematic diagram of the electrical circuit employed with the touch sensor system of FIG. 1.

System 10 of FIG. 1 may be driven by the circuit shown in FIG. 4. Signal generator 100, typically a sine generator, provides input to each of the four corner drivers 102, 104, 106 and 108, which drive corner contacts 20, 22, 24 and 26, respectively. A typical corner driver, as shown in detail with respect to corner driver 102, includes amplifier 110 that receives the input from signal generator 100 and provides an output on line 34 to drive corner contact 20. Current sensor 112 senses the current and reflects any change therein on line 114. Corner drivers 104, 106 and 108 operate similarly to provide similar signals on line 116, 118 and 120, which are connected to position detector circuit 122 which determines the touch position as a function of the relative current amplitudes and provides an indication of the touch position at its output 124. Position detection circuit 122 may actually be sensitive to any one of a number of different parameters: frequency, phase, voltage or current, but in the end it is the change in current caused by the touch on the touch sensor surface that indicates the touch position. Signal generator 100 also drives amplifier 130 whose output delivered on line 44 operates back shield 16, all of which is known in the prior art as exemplified by U.S. Pat. Nos. 4,071,691, 4,129,747, 4,198,539, 4,293,734, 4,302,011, 4,371,746, 4,430,917, earlier incorporated herein by reference.

In accordance with this invention, driver 140 for front shield 30 includes amplifier 142 which responds to signal generator 100 to provide an output over line 46 to front shield 30. Feedback loop 144 of amplifier 142 may include a gain control circuit 146 if desired so that the voltage on front shield 30 may be less than, equal to or more than the voltage applied to the corner contacts 20–26 and the front shield 30 may even be set to ground voltage. Resistor 148 interconnects feedback loop 144 with ground.

Although corner drivers 102, 104, 106 and 108, front shield drive 140 and back shield drive 130 are all shown separately in FIG. 4, this is not a necessary limitation of the invention, as all of those drivers may be integrally formed as a single assembly 150, indicated in phantom. Further, wires 114, 116, 118, 120, FIG. 2, may be included in a single cable such as a flat cable 121, shown in phantom, and wires 46 and 44 may be a part of that same cable constituted as a six-wire flat cable.

Figure 5:
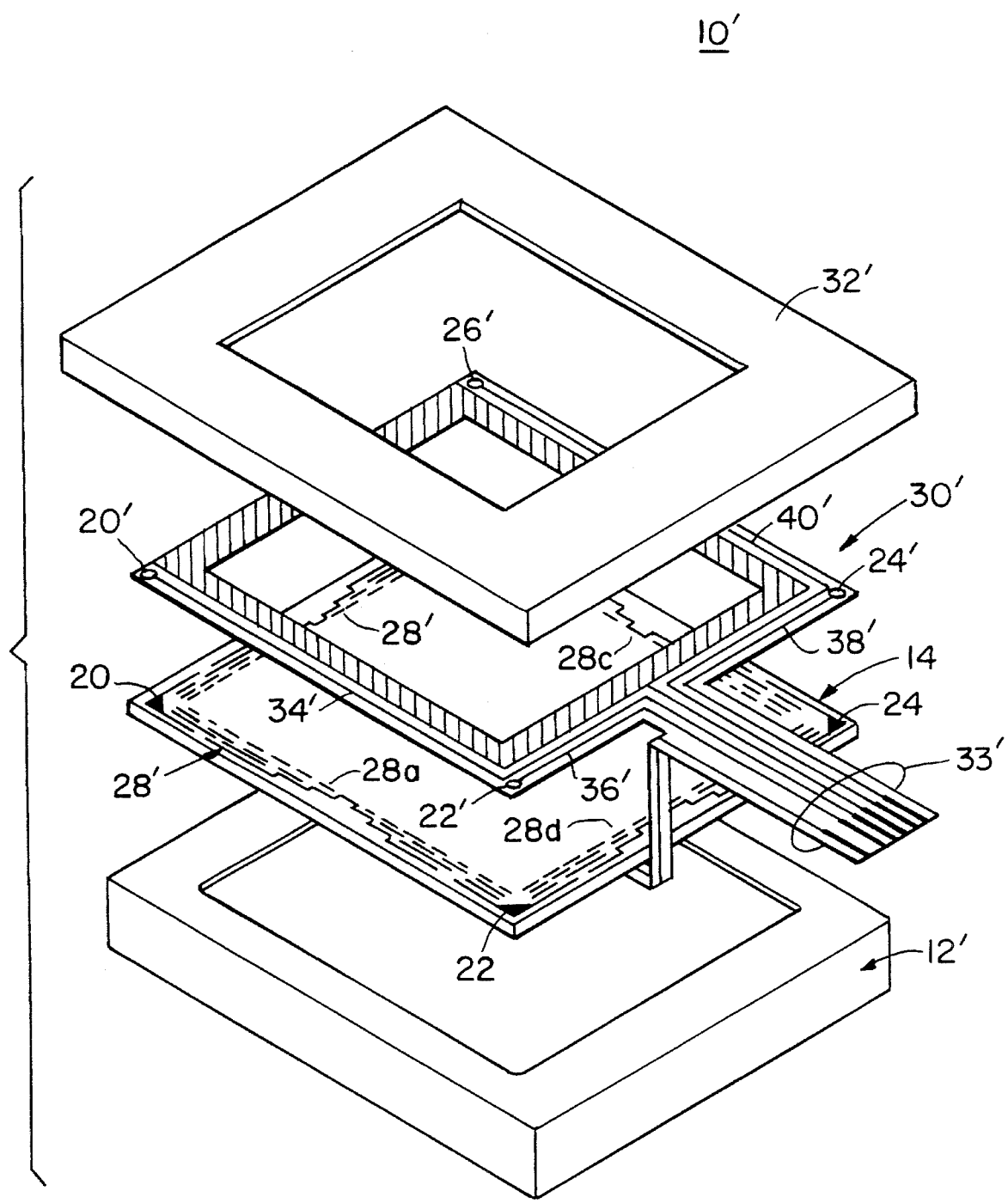
FIG. 5 is an exploded isometric view of a touch sensor system of an alternative construction using the front shield according to this invention in which the front shield includes integral conductors for the corner contacts.

In one construction touch system 10', FIG. 5, where like parts have been given like numbers and similar parts like numbers primed, conductors 34', 36', 38' and 40' replace wires 34, 36, 38 and 40, FIG. 1, and are formed integrally with front shield 30' to serve four corner terminals 20', 22', 24' and 26' to simplify and minimize packaging and wiring. Terminals 20', 22', 24' and 26' electrically engage corner sensing contacts 20, 22, 24 and 26.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A frontally shielded capacitive touch sensor system, comprising:

a capacitive touch sensor having a touch sensitive surface;

a front shield mounted in front of said touch sensor and extending peripherally about said surface surrounding an exposed accessible area of said touch sensitive surface;

means for providing a first voltage on said touch sensor and means for detecting a change in capacitance representative of a touch to said touch sensor and for providing a second voltage on said front shield for controlling the capacitance between said touch sensor and said front shield and shielding the system from stray capacitance occurring at said front shield.

2. The frontally shielded capacitive touch sensor system of claim 1 in which said second voltage is substantially equal to said first voltage and substantially eliminates the capacitance between said front shield and said surface and said stray capacitance occurring at said front shield.

3. The frontally shielded capacitive touch sensor system of claim 1 in which said second voltage is greater than said first voltage and substantially eliminates the capacitance between said front shield and said surface, said stray capacitance occurring at said front shield, and substantially compensates for stray capacitance between said exposed accessible area and the ambient atmosphere.

4. The frontally shielded capacitive touch sensor system of claim 1 in which said second voltage is less than said first voltage.

5. The frontally shielded capacitive touch sensor system of claim 1 in which said second voltage is ground voltage.

6. The frontally shielded capacitive touch sensor system of claim 1 in which said means for providing a first voltage includes a voltage distribution network disposed about the periphery of said touch sensitive surface and said front shield covers said distribution network.

7. The frontally shielded capacitive touch sensor system of claim 1 in which said front shield includes a front conductive layer and a back non-conductive layer.

8. The frontally shielded capacitive touch sensor of claim 1 in which said means for providing said first and second voltages includes conductor means for interconnecting with said touch sensor.

9. The frontally shielded capacitive touch sensor of claim 1 in which said conductor means are integral with said front shield.

10. frontally shielded capacitive touch sensor of claim 9 in which said touch sensor includes a plurality of sensing contacts and said conductor means includes a plurality of terminals for engaging said contacts.

* * * * *